(12) United States Patent
McCulloch

(10) Patent No.: US 7,080,021 B1
(45) Date of Patent: *Jul. 18, 2006

(54) METHOD AND APPARATUS FOR MANAGING TRANSPORTATION FROM AN ORIGIN LOCATION

(75) Inventor: Mark McCulloch, Highlands Ranch, CO (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/550,963

(22) Filed: Apr. 17, 2000

(51) Int. Cl.
*G06Q 10/00* (2006.01)
(52) U.S. Cl. .................................................. 705/5
(58) Field of Classification Search ................ 705/5, 705/6, 7
See application file for complete search history.

(56) References Cited

U.S. PATENT DOCUMENTS

| | | | |
|---|---|---|---|
| 4,879,648 A | * | 11/1989 | Cochran et al. |
| 5,021,953 A | * | 6/1991 | Webber et al. .................. 705/6 |
| 5,237,499 A | * | 8/1993 | Garback |
| 5,948,040 A | * | 9/1999 | DeLorme et al. |
| 6,085,976 A | * | 7/2000 | Sehr ........................... 235/384 |
| 6,163,748 A | * | 12/2000 | Guenther ..................... 701/202 |
| 6,275,808 B1 | * | 8/2001 | deMarcken |
| 6,526,335 B1 | * | 2/2003 | Treyz et al. ................... 701/1 |

FOREIGN PATENT DOCUMENTS

WO    WO 99/01822    * 1/1999

OTHER PUBLICATIONS

Ellis, Jim; Planning a Trip? Let your PC do the legwork; Feb. 1990; BusinessWeek p. 92; dialog copy 2 pages.*
UPS website; Dec. 12, 1998; Wayback machine archive.*
Travelocity website; Dec. 12, 1998; Wayback machine archive.*
Expedia website; Apr. 27, 1999; Wayback machine archive.*

* cited by examiner

*Primary Examiner*—Thomas A. Dixon
(74) *Attorney, Agent, or Firm*—Snell & Wilmer L.L.P.

(57) ABSTRACT

An electronic method for managing transportation from an origin location, the method including the steps of: receiving an activity indicator including an activity location and an activity start time; identifying at least a first airport (or other origin location), the first airport being within a first threshold measurement of the activity location; and identifying at least a first departing flight (or other mode of transportation) associated with the at least the first airport, the identified at least a first departing flight associated with a flight arrival time and being at least between the origin location and the at least the first airport; wherein the flight arrival time of the at least the first identified departing flight is prior to the activity start time.

14 Claims, 3 Drawing Sheets

METHOD AND APPARATUS FOR MANAGING TRANSPORTATION FROM AN ORIGIN LOCATION

BACKGROUND OF THE INVENTION

1. Field of the Invention

The present invention relates generally to information collection and management systems, and in particular but not by way of limitation, to transportation planning and logistical management systems.

2. Background of the Invention

Existing transportation management systems suffer from significant drawbacks that make logistical planning difficult and often unnecessarily time consuming and expensive. For example, existing electronic travel products offer travelers little more than an attractive graphical user interface ("GUI") on top of a decades-old Global Distribution System ("GDS") that was created merely to distribute a significant amount of perishable airline data to travel agencies. That is, existing electronic travel systems offer only a user friendly graphically interface for interacting with an antiquated data management system.

In particular, these existing electronic travel systems require a traveler to know a great deal of information prior to making travel arrangements. Travelers, for example, are expected to know which airports could be appropriate for particular destinations and which flight arrival times are available at each appropriate airport. Moreover, travelers are expected to know which flight arrival times are early enough to meet the traveler's particular needs. However, to know which flight times are appropriate, the traveler must also know the driving distance and/or driving time between the airport(s) and the traveler's destination.

Because of this lack of information made available through existing systems, travelers must research travel information prior to actually using those systems. Unfortunately, travel information is presently spread throughout various sources varying from electronic sources to co-workers, to friends and business contacts. Thus, presently there is no easy and efficient way to electronically make travel arrangements without significant independent research prior to actually scheduling the travel. Moreover, corporations often unnecessarily waste money because their employees do not travel in the most efficient manner. That is, employees that schedule their own travel might overlook less expensive—but equally as acceptable—options such as flying into San Jose rather than San Francisco for a meeting that is scheduled in Palo Alto.

Accordingly, a system and method are needed to overcome the deficiencies of existing systems as described above and other deficiencies as recognized by those skilled in the art. In particular, a system and method are needed for accumulating, consolidating, and managing travel information to thereby make logistical planning simpler.

SUMMARY OF THE INVENTION

To remedy the deficiencies of existing systems and methods, the present invention provides a method and apparatus for travel information and other transportation information collection and logistical management. In particular, one embodiment of the present invention provides an electronic method for managing transportation from an origin location. The method can include the steps of: receiving an activity indicator including an activity location and an activity start time; identifying at least a first airport, the first airport being within a first threshold measurement of the activity location; and identifying at least a first departing flight associated with the at least the first airport, the identified at least a first departing flight associated with a flight arrival time and being at least between the origin location and the at least the first airport; wherein the flight arrival time of the at least the first identified departing flight is prior to the activity start time.

In another embodiment, each of the identified flights can be associated with a characteristic data item. This embodiment could then include steps of: comparing the characteristic data item for each of the identified plurality of flights with a flight preference; and identifying each of the identified plurality of flights that corresponds with the flight preference.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
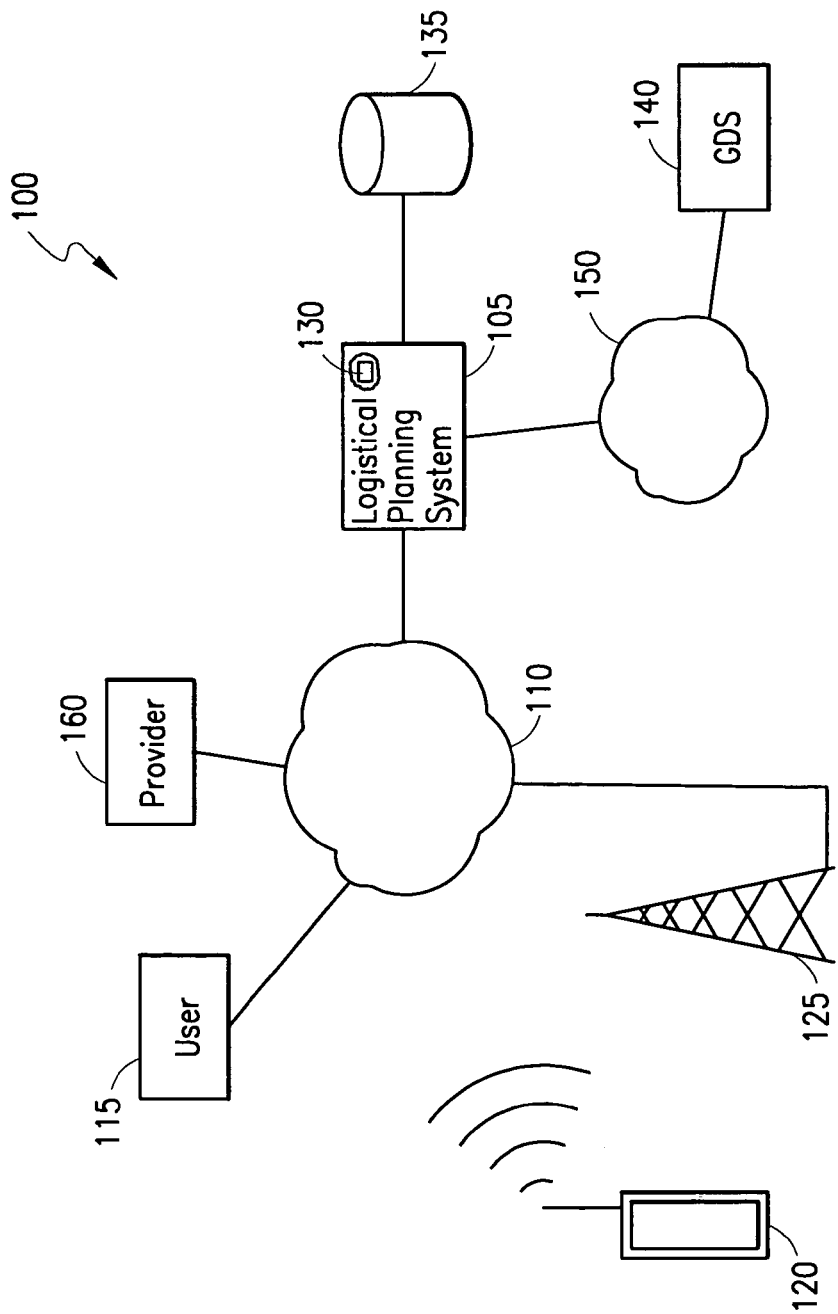
FIG. 1 illustrates a system designed in accordance with the principles of the present invention.

Although the present invention is open to various modifications and alternative constructions, a preferred exemplary embodiment that is shown in the drawings is described herein in detail. It is to be understood, however, that there is no intention to limit the invention to the particular forms disclosed. One skilled in the art can recognize that there are numerous modifications, equivalences and alternative constructions that fall within the spirit and scope of the invention as expressed in the claims.

Referring now to FIG. 1, there is illustrated a system 100 for collecting, managing and dispersing travel information. The system 100 includes a logistical planning system 105 connected to a network 110 such as the Internet. The logistical planning system 105 can include at least one microprocessor 130 and non-volatile storage such as storage device 135. Moreover, the logistical planning system 105 can be accessed by a user, such as user 115, through the network 110. Additionally, a wireless user, such as wireless user 120, can access the logistical planning system 105 through the wireless network 125 and the network 110.

Still referring to FIG. 1, user 115 and/or wireless user 120 can access the logistical planning system 105 through, for example, a website or through any other type of interface. In response to being accessed by a user—through a website or otherwise—the logistical planning system 105 can retrieve information (e.g., personal preferences) for that particular user from a storage element 135 or may request some information directly from the user.

Once the user has indicated the need to schedule a particular activity, e.g., a business meeting, the logistical planning system 105 can collect relevant travel data, if required, from the GDS 140, which can be connected to the logistical planning system 105 by a network 150 or any other means. (This network 150 can be a separate and distinct network from the network 110, or it can be the same network.) Additionally, the logistical planning system 105 may collect certain travel information from the provider 160 or from the storage element 135. For example, the logistical planning system 105 could access a website for a car rental company to determine pricing and availability.

In one embodiment of the present invention, user 115 and/or wireless user 120 can include personal information managers (PIMs) and/or other computing devices configured to integrate one or more of scheduling software, Internet (or other network) software and specialized travel management software. For example, the computing device associated with user 115 can be configured to read a scheduled event from scheduling software such as Microsoft Outlook® and then match that scheduled event with addresses stored in an electronic address book. That is, if the scheduled event was to take place at ACME Corporation, the software could, automatically or otherwise, access the user's address book and determine the address of ACME. Alternatively, the user could directly input the address where the scheduled event is to take place and transmit that address to the logistical planning system 105.

Figure 2:
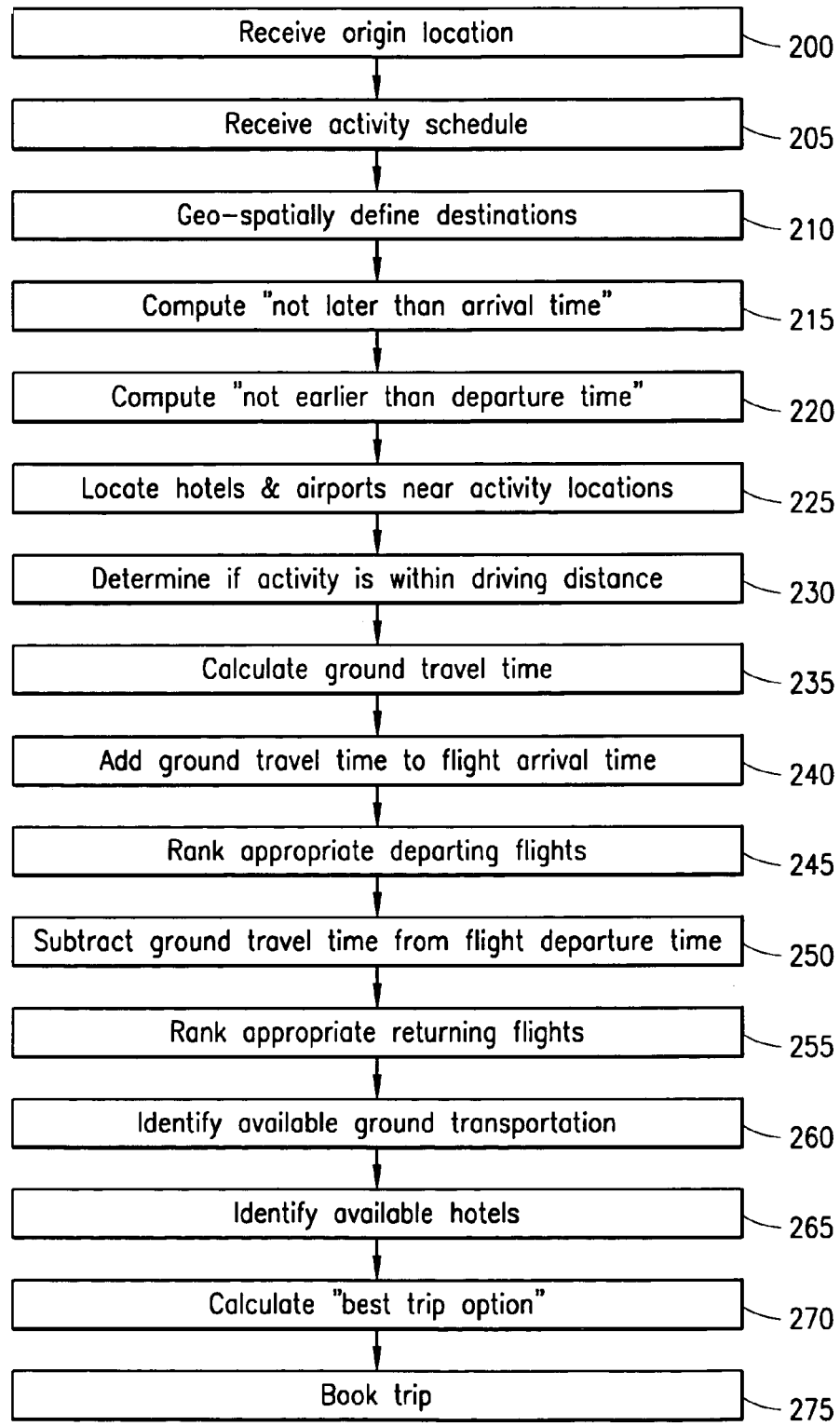
FIG. 2 is a flow chart demonstrating one embodiment of the operation of a travel management system constructed in accordance with the principles of the present invention.

Once the location, start time, and duration of the scheduled event are known, that information can then be transmitted through the network 110 to the logistical planning system 105. The logistical planning system 105 could then collect the relevant travel data from the GDS 140, the provider 160, and/or any other relevant location. The logistical planning system 105 can then process that collected information and return transportation options for the scheduled activity to the user. Referring now to FIG. 2, there is illustrated a flow chart demonstrating one embodiment of the operation of a logistical planning system 105 constructed in accordance with the principles of the present invention. One skilled in the art, however, can readily recognize that the method described herein can be practiced in various ways and should not be limited to include all of the steps illustrated in FIG. 2. Furthermore, one skilled in the art can readily recognize that the steps can be practiced in virtually any order and that many of the steps can be conducted in parallel.

In operation, the logistical planning system 105 should know a traveler's origin or home location. For example, the logistical planning system 105 should be aware that user's 115 trips should generally originate from Dallas, Tex. and generally terminate at Dallas, Tex. This origin location can be received from the user directly and stored at the storage element 135 for later use, or alternatively, this origin location could be sent as part of a bulk transaction for numerous employees of a particular company (step 200).

When the logistical planning system 105 knows a traveler's origin location, the logistical planning system 105 can schedule transportation options by receiving an indication of a scheduled activity (step 205). This indication of the scheduled activity ideally includes a destination, a start time for the event, and a stop time for the event. Alternatively, the indication of the scheduled activity can include a destination, a start time for the event, and a duration of the event.

Once the logistical planning system 105 is informed of the traveler's activities—including a destination corresponding to those activities—the logistical planning system 105 geospacially (or otherwise) defines that destination (step 210) or at least prompts some other party to provide it with such geo-spacial definitions. Next, the logistical planning system 105 can compute a "not later than arrival time" (step 215) and/or a "not earlier than departure time" (step 220) based upon the start time and/or duration of the scheduled activity.

These computed times and geographies subsequently can be used to determine which modes of transportation are most suitable. For example, if a traveler's destination is over 300 miles, then the air mode of transportation might be selected and the flights most appropriate for the traveler can be identified.

The logistical planning system 105 can then locate airports and/or hotels (or any other establishments) that are near the location of the scheduled activity (step 225). For example, the logistical planning system 105 could locate hotels within walking distance, within a set distance of the location of the scheduled activity or within any other threshold measurement. Similarly, the travel management system could locate airports within, for example, 50 miles of the activity location and/or within a time threshold, such as within 90 minutes of the location of the scheduled activity. In one embodiment, the logistical planning system 105 collects proximity information about hotels and airports by accessing an outside system and/or accessing its own internal database.

At some point during this process, the logistical planning system 105 computes the driving distance and/or driving time between the traveler's origin location and the location of the scheduled activity. When the driving distance and/or driving time are below certain thresholds, the logistical planning system 105 notifies the traveler that driving is preferable to any other mode of transportation for this scheduled activity (step 230). Accordingly, unless otherwise notified, the logistical planning system 105 does not make transportation reservations for the scheduled activity. However, the logistical planning system 105 still can make hotel reservations if needed.

Assuming air travel is needed, however, the logistical planning system 105 calculates the ground travel time between the various identified airports and the location of the scheduled activity (or hotel) (step 235). (Alternatively, the logistical planning system can identify an alternate mode of transportation, e.g, train, bus, etc., and make all calculations accordingly.) In one embodiment, this calculated ground travel time is used to screen airports that are too far from the activity location. In another, preferred embodiment, the calculated ground travel time is used as a factor in ranking the airports according to their desirability.

In another embodiment, the logistical planning system 105 can add the calculated ground travel time to flight arrival times (step 140). The result of the summation represents the earliest time that the traveler actually could be at the location of the scheduled activity for each particular flight. Thus, the result of the summation is used to determine which departing flights are most appropriate for the traveler (step 245). That is, if the result of the addition of the flight arrival time and the ground travel time, is later than the computed "not later than arrival time, that departing flight may be inappropriate for the traveler. As can be appreciated, at this time the logistical planning system 105 may identify numerous flights that are appropriate for the traveler. One particular flight from that list, however, should be ranked highest (i.e., the optimal flight) based upon flight rankings.

After (or even prior or concurrently with) the departing flights have been identified, the logistical planning system 105 identifies potential return (from the perspective point of origin location) flights based upon flight departure times and/or ground travel time between the location of the scheduled activity (or hotel if appropriate) and the airport (steps 250 and 255). Again, numerous flights may be identified as appropriate return flights, but, in one embodiment, only one will likely be ranked as the optimal flight. Those flights not ranked as the optimal flight can be retained as alternative flights. If a traveler desires, he can select one of these alternative flights rather than the optimal flight, or the logistical planning system may select one of these flights to arrange the overall "best trip option."

Furthermore, in one embodiment of the present invention, the logistical planning system 105 adds extra time for luggage pick-up and/or rental car pick-up, if necessary. For example, if the scheduled activity requires an overnight stay and a rental car from an off-airport rental car agency, the logistical planning system 105 may add one extra hour to the sum of the ground travel time and the flight arrival/departure time to compensate for luggage pick-up time and rental car pick-up/drop-off time.

In yet another embodiment of the present invention, the departing flight can be scheduled to go to an alternate destination rather than the traveler's origin location. For example, if the traveler has two activities in different locations scheduled in close succession, the flight leaving the first meeting may go directly to an airport near the location of the second activity. The logistical planning system 105 could then compute a third leg returning the traveler from the second activity location to the traveler's origin location. In this embodiment of the present invention, the logistical planning system 105 can make necessary arrangements for hotels and ground transportation at the location of the second activity. Additionally, the logistical planning system 105 can determine whether a second flight is even necessary or whether the traveler should instead, for example, drive from the first scheduled activity to the second scheduled activity.

Furthermore, the logistical planning system 105 can identify and rank available ground transportation from the airport to the hotel, from the airport directly to the activity location, and/or between the hotel and the activity location (step 260). For example, the logistical planning system 105 can identify shuttles associated with particular hotels, rental car agencies, and availability of mass transit such as subways and taxis. Furthermore, in one embodiment, the present invention can also identify when no ground transportation is needed because all destinations are within walking distance.

Additionally, based upon the length of travel, the start time for the scheduled activity and/or the duration of the scheduled activity, a hotel may or may not be necessary for a particular scheduled activity. However, if a hotel is necessary, then the logistical planning system 105 can determine that a hotel is necessary and identify available hotels for the scheduled activity (step 265). As with available flights, available hotels can be ranked according to desirability. For example, the logistical planning system 105 can compare the various travel options with company policies, which may state that hotels can cost a maximum of $100 per night. Thus, the logistical planning system 105 could rank hotels costing over $100 a night as less favorable than a hotel costing under $100 a night.

Furthermore, in one embodiment, the assumption in scheduling hotels is that the traveler will check into the hotel after the scheduled activity. If, however, the flight arrangements bring the traveler to the area of the scheduled activity the night before the scheduled activity, the logistical planning system 105 can assume that the traveler will check into the hotel before the activity.

Although individual components of the trip might be rated as optimal, the overall "best trip option" might use lower ranked options of each trip component in planning the entire trip. That is, the logistical planning system 105 collects the rankings for each individual component of the trip (travel, lodging, ground transportation, etc.) and calculates an overall "best trip option" by, for example, maximizing the individual trip component rankings (step 270). For example, assume that the logistical planning system 105 identifies flight A as the optimal flight and a rental car as the optimal ground transportation. However, when flight A and the rental car are considered in combination, the combination is not optimal when compared to flight A and a taxi (the taxi being faster but more expensive than the rental car) because the time used to pick-up the rental car would cause the traveler to miss the scheduled activity while the more expensive taxi would permit on-time arrival. Thus, the logistical planning system 105 would identify flight A and the taxi as the "best trip option" even though the taxi is not the most favorably ranked ground transportation option.

As can be appreciated, rankings for "best trip option" on the individual travel components can be calculated in a variety of ways. For example, factors might be "quickest trip" or "cheapest trip." That is, the logistical planning system 105 can most favorably rank the options that keep the traveler away from home the least amount of time. Another factor might be "relaxed trip" wherein the traveler is given a significant cushion before and/or after the scheduled activity. This feature allows the traveler more flexibility and greater assurances that he can be at the scheduled event on time and can stay for a late meeting or an unscheduled event after the scheduled stop time for the activity.

If the traveler approves of the "best trip option" as determined by the logistical planning system 105 (step 270), the logistical planning system 105 can make the necessary reservations for the trip through the GDS 140 (shown in FIG. 1) or an alternate provider (step 275). However, if the traveler does not approve of the "best trip option," the various lower ranked options for each line item (e.g. air, hotel, and ground) can be displayed for the traveler. The traveler then can manually select the desired travel arrangements. The logistical planning system 105 can be designed not to let the traveler choose any arrangements outside company policy or, rather, to merely indicate that the traveler is not traveling within company policy. Additionally, the logistical planning system 105 can indicate that the traveler's selected options are inappropriate for time or other reasons. Moreover, the logistical planning system 105 can require expense codes, excuse codes or management notification before a traveler is allowed to schedule any options that are outside company policy.

Figure 3:
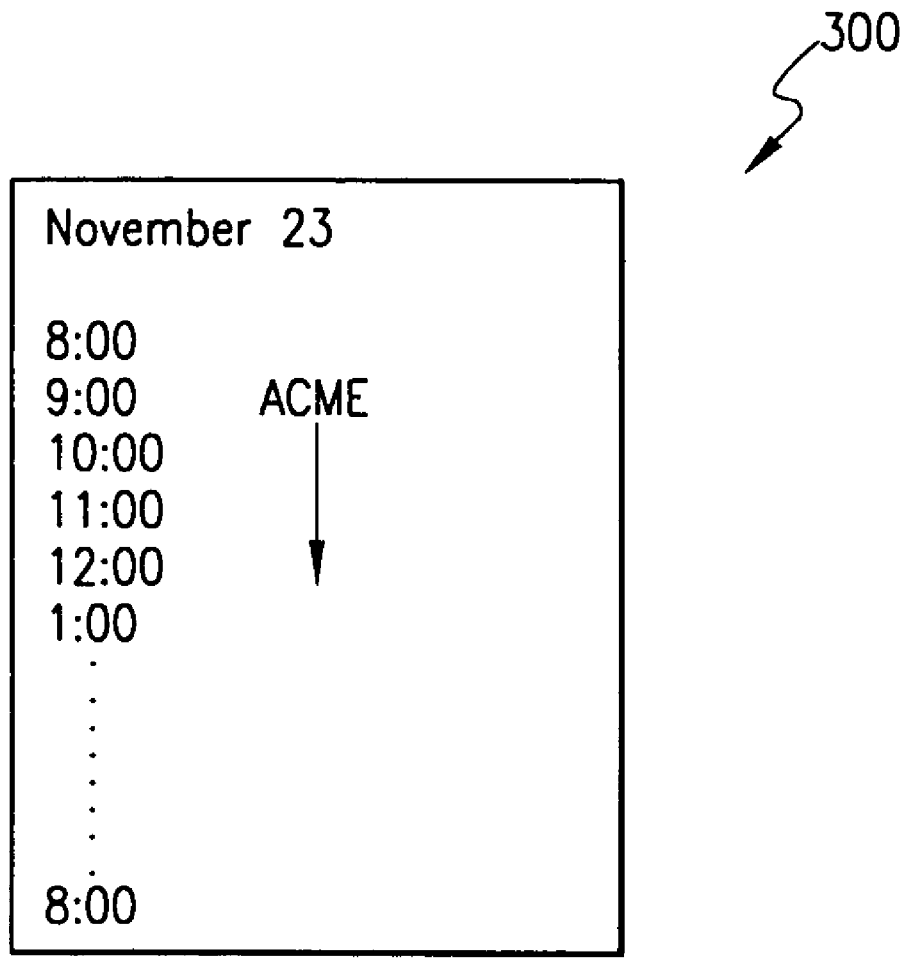
FIG. 3 illustrates an electronic scheduler usable to arrange travel in accordance with the principles of the present invention.

Referring now to FIG. 3, there is illustrated an electronic scheduler 300 used in accordance with the principles of the present invention. A traveler can use the electronic scheduler 300 to transmit data to the logistical planning system 105 (shown in FIG. 1). To utilize the electronic scheduler 300, in one embodiment, the traveler need only enter the scheduled activity and indicate the duration thereof. For example, the traveler could enter ACME at 9:00 and indicate that the meeting lasts until 12:00. This activity information could then be transmitted over the network 110 to the logistical planning system 105. Using that information and possibly a profile for the traveler, the logistical planning system 105 can return an itinerary for a complete trip. This itinerary could include the "best trip option."

In conclusion, one embodiment of the present invention provides for a method and apparatus for collecting, managing, and processing travel information in such a way that transportation can quickly and efficiently be planned. In particular, one embodiment of the present invention provides a system and method for receiving an indication of a scheduled activity and arranging travel based upon that scheduled activity and a traveler profile.

Although the present invention generally has been described in relation to travelers and airline flights, one skilled in the art can recognize that the present invention can be used to plan transportation of any object (e.g., cargo, etc.) over any mode of transportation (e.g., train, bus, truck, ship, etc.) or any combination of modes of transportation. For example, the present invention could be used to schedule cargo shipments that include trains, ships, and trucks.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions will fall within the scope and spirit of the disclosed invention as expressed in the claims.

What is claimed is:

1. A computer implemented method for managing transportation from an origin location, the method comprising the steps of:
   receiving, from a client computer, an activity indicator including an activity location and an activity start time;
   identifying, at a host computer, a first airport, the first airport being within a first threshold measurement of the activity location, wherein the first threshold measurement comprises at least one of a walking distance, a set distance, and a time threshold;
   computing an optimal arrival time from the activity start time, the activity location, and the first airport;
   identifying, at the host computer, a first departing flight associated with the first airport, the identified first departing flight associated with a flight arrival time and the identified first departing flight being between the origin location and the first airport;
   wherein the flight arrival time of the identified first departing flight is prior to the optimal arrival time;
   identifying, at the host computer, an optimal ground transportation option between the first airport and the activity location;
   determining, at the host computer, an optimal trip option for transportation from the origin location to the activity location, wherein the optimal trip option includes the identified first departing flight and the optimal ground transportation option;
   compiling, at the host computer, a travel itinerary based on the optimal trip option for transportation; and,
   receiving, at the client computer, the travel itinerary.

2. The computer implemented method of claim 1, wherein the step of identifying the first airport includes the step of identifying a plurality of airports and wherein the step of identifying the first departing flight includes the step of identifying a plurality of flights associated with each of the plurality of airports.

3. The computer implemented method of claim 2, wherein each of the identified plurality of flights is associated with a characteristic data item, the method further comprising the steps of:
   comparing, at the host computer, the characteristic data item for each of the identified plurality of flights with a flight preference; and
   ranking, at the host computer, each of the identified plurality of flights according to the flight preference.

4. The computer implemented method of claim 3, wherein the step of comparing the characteristic data item includes the step of comparing the flight price for each of the identified plurality of flights with a flight price maximum; and wherein the step of ranking each of the identified plurality of flights includes the step of ranking each of the identified plurality of flights according to the comparison of the flight price to the flight price maximum.

5. The computer implemented method of claim 1, wherein the step of identifying the first departing flight includes the steps of:
   calculating a travel time between the first airport associated with the first departing flight and the activity location; and
   determining an activity location arrival time, the activity location arrival time indicating a summation of the flight arrival time and the calculated travel time;
   wherein the determined activity location arrival time is prior to or equivalent to the activity start time.

6. The computer implemented method of claim 1, wherein the step of identifying the first departing flight includes the steps of:
   calculating a travel time between the first airport associated with the first departing flight and the activity location; and
   determining an earliest flight arrival time, the earliest flight arrival time representing the result of subtracting the calculated ground travel time from the activity start time;
   wherein the arrival time of the first flight is prior to or simultaneous with the determined earliest flight arrival time.

7. The computer implemented method of claim 1, further comprising the steps of:
   receiving, at the host computer, an activity stop time indicator, the activity stop time indicator indicating a stop time for the activity; and
   identifying, at the host computer, a first returning flight, the first returning flight associated with a flight departure time and being between the first airport and the origin location;
   wherein the flight departure time of the identified first returning flight is subsequent to the stop time for the activity.

8. The computer implemented method of claim 7, further comprising the steps of:
   determining, at the host computer, if the flight arrival time of the identified first departing flight is on a first day and if the flight departure time of the identified first returning flight is on a second day;
   responsive to determining that the flight arrival time of the identified first departing flight is on the first day and that the flight departure time of the identified first returning flight is on the second day, identifying, at the host computer, a plurality of lodging locations within a lodging threshold distance of at least one of the first airport and the activity location.

9. The method of claim 8, further comprising the step of:
   reserving one of the identified plurality of lodging locations.

10. The method of claim 1, wherein the step of receiving an activity indicator includes the step of receiving an address for the activity location.

11. The method of claim 1, wherein the step of identifying the first airport includes the step of identifying the first airport, the first airport being within a temporal threshold measurement of the activity location.

12. A computer implemented method for receiving an electronic signal from a first electronic device at a second electronic device, the electronic signal capable of activating the second electronic device, wherein the second electronic device is responsive to the electronic signal to thereby perform steps for managing transportation from an origin location, the steps comprising:

receiving, at the second electronic device, an activity indicator including an activity location and an activity start time;

identifying, at the second electronic device, a first airport, the first airport being within a first threshold measurement of the activity location, wherein the first threshold measurement comprises at least one of walking distance, a set distance, and a time threshold;

computing an optimal arrival time from the activity start time, the activity location, and the first airport;

identifying, at the second electronic device, a first departing flight associated with the first airport, the identified first departing flight associated with a flight arrival time and being between the origin location and the first airport;

wherein the flight arrival time of the identified first departing flight is prior to optimal arrival time;

identifying, at the second electronic device, an optimal ground transportation option between the first airport and the activity location;

determining, at the second electronic device, an optimal trip option for transportation from the origin location to the activity location, wherein the optimal trip option includes the identified first departing flight and the optimal ground transportation option;

compiling at the host computer, a travel itinerary based on the optimal trip option for transportation; and, receiving, at the client computer, the travel itinerary.

13. The computer implemented method of claim 12, wherein the second electronic device is responsive to the electronic signal to thereby perform steps comprising:

calculating, at the second electronic device, a travel time between the first airport associated with the first departing flight and the activity location; and determining, at the second electronic device, an activity location arrival time, the activity location arrival time indicating a summation of the flight arrival time and the calculated travel time;

wherein the determined activity location arrival time is prior to or equivalent to the activity start time.

14. The computer implemented method of claim 12, wherein the second electronic device is responsive to the electronic signal to thereby perform steps comprising:

calculating, at the second electronic device, a travel time between the first airport associated with the identified first departing flight and the activity location; and determining, at the second electronic device, an earliest flight arrival time, the earliest flight arrival time representing the result of subtracting the calculated ground travel time from the activity start time;

wherein the arrival time of the at least the first flight is prior to or simultaneous with the determined earliest flight arrival time.

* * * * *